United States Patent [19]

Nilsen

[11] Patent Number: 5,035,559

[45] Date of Patent: Jul. 30, 1991

[54] ANCHORING DEVICE

[75] Inventor: Martin J. Nilsen, Hampshire, Ill.

[73] Assignee: Illinois Tool Works, Inc., Glenview, Ill.

[21] Appl. No.: 459,491

[22] Filed: Jan. 2, 1990

[51] Int. Cl.⁵ .................... F16B 15/06; F16B 19/00
[52] U.S. Cl. ................................ 411/508; 411/456; 411/514; 411/913
[58] Field of Search ............ 411/447, 451, 456, 514, 411/508–510, 913; 403/405

[56] References Cited

U.S. PATENT DOCUMENTS

| | | | |
|---|---|---|---|
| 1,574,790 | 3/1926 | Carroll | 411/456 |
| 4,828,445 | 5/1989 | Giannuzzi | 411/451 |

FOREIGN PATENT DOCUMENTS

| | | | |
|---|---|---|---|
| 915732 | 11/1953 | Fed. Rep. of Germany | 411/456 |
| 3620372 | 1/1988 | Fed. Rep. of Germany | 411/456 |
| 2468024 | 4/1981 | France | 403/405 |
| 55-122918 | 9/1980 | Japan | 411/456 |

Primary Examiner—Neill R. Wilson
Attorney, Agent, or Firm—Schwartz & Weinrieb

[57] ABSTRACT

An anchoring device having a head and a shank integral with the head and adapted to be forcibly driven into a hole having a cylindrical wall defined within a body of concrete, masonry, or like material. The shank has a spring temper and has a proximal portion, a distal portion, and a transitional portion joined to the proximal portion at a proximal elbow and to the distal portion at a distal elbow. Each such portion is substantially straight when the shank is unstressed. The shank has a substantially uniform, substantially circular cross-section, except at the elbows, where the shank has smaller cross-sections causing the shank to be preferentially bendable at the elbows. Each of the proximal and distal portions has an axial length equal to at least approximately twice its diameter. The transitional portion has an axial length approximately equal to its diameter. The distal portion facilitates initial entry of the shank into the hole. The distal and transitional portions act as lever arms bearing at the elbows and against the cylindrical wall of the hole as the shank is driven further into the hole.

16 Claims, 2 Drawing Sheets

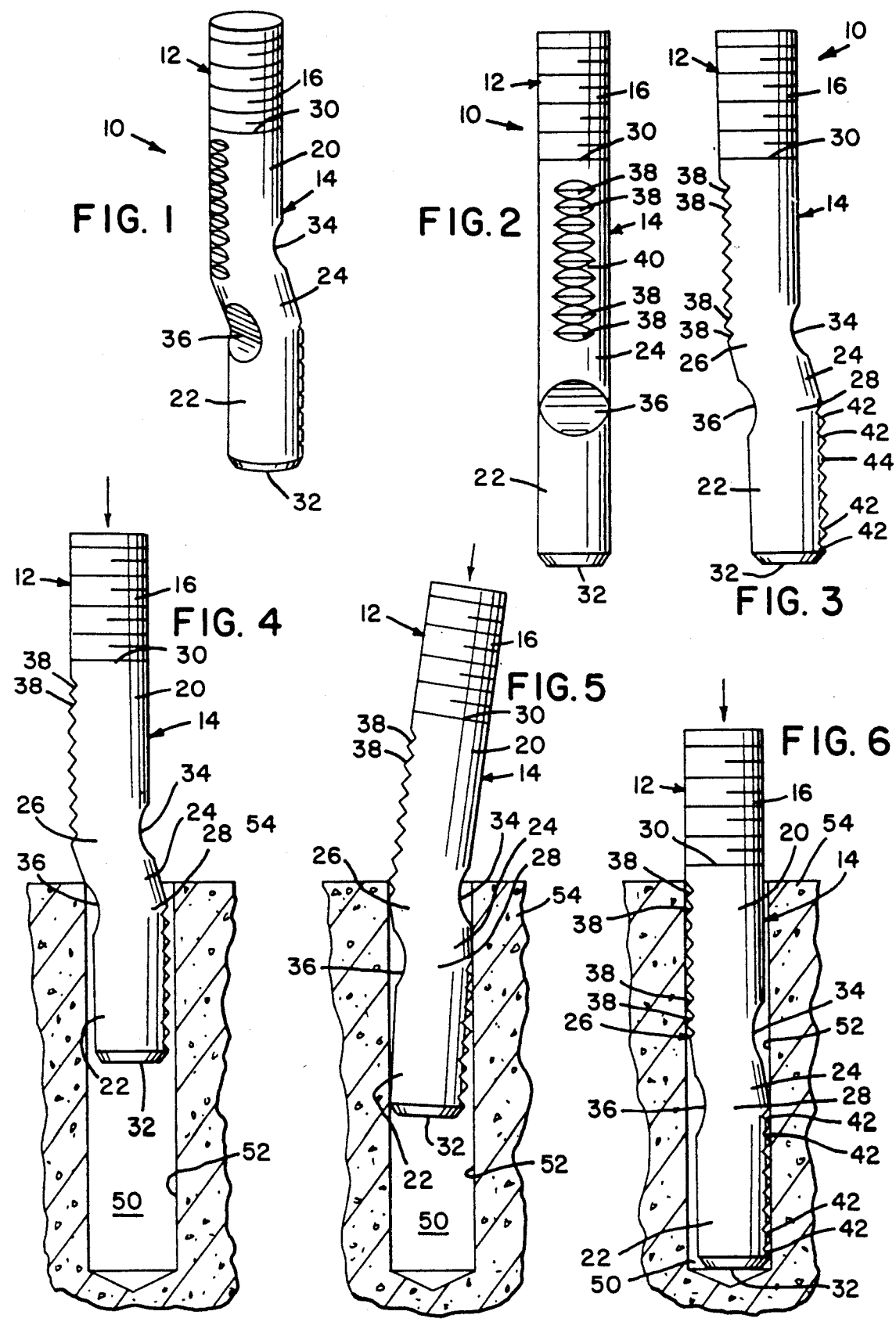

ANCHORING DEVICE

TECHNICAL FIELD OF THE INVENTION

This invention pertains to an anchoring device having a head, which is adapted to mount an external element, and a shank, which is adapted to be forcibly driven into a hole that has been drilled into a body of concrete, masonry, or like material so as to become anchored within the hole.

BACKGROUND OF THE INVENTION

Various anchoring devices are known, which are designed to be forcibly driven into a hole that has been drilled into a body of concrete, masonry or like material so as to become anchored within the hole. Concrete and masonry are characterized by high compressive strength and, therefore, exhibit very little yield when compressed. Typically, such an anchoring device has a head, which is adapted to mount an external element, and a shank, which is integral with the head. When the head is struck by means of a hammer or by means of a driving ram of a powered tool, the shank is forcibly driven into the hole, within which the shank becomes anchored.

Two-piece anchoring devices are known, in connection with which sleeves or other elements are expanded when such devices are driven. One-piece anchoring devices are known, moreover, and are preferred in many applications. Typically, a one-piece anchoring device has a shank portion that is deformed when such device is driven into a hole. The deformed portion anchors the shank within the hole.

A variation of a one-piece anchoring device is disclosed in Giannuzzi U.S. Pat. No. 4,828,445. As disclosed therein, the anchoring device has a resilient shank, which is shaped with one or more undulations near its distal end. The resilient shank tends to be forcibly deformed when it is driven into a hole and to seek to recover its original shape after it has been driven into the hole. The resilient shank is described as exerting outward pressure at three distinct levels for each undulation.

The anchoring device described in the Giannuzzi patent noted above can be quite difficult to install in many applications. It can be quite difficult to deform the undulations near the distal end of its shank when it is driven into a hole having a cross-section that approximates the cross-section of the shank.

There has therefore been a need, to which this invention is addressed, for an improved, one-piece anchoring device that can be easily installed within a hole provided within a body of concrete, masonry, or like material.

SUMMARY OF THE INVENTION

This invention provides an anchoring device that can be easily installed in most applications. The anchoring device, which preferably is made a single piece, has a head and a shank. The head is integral with the shank and is adapted to mount an external element. The shank is adapted to be forcibly driven into a hole with a cylindrical wall defined within a body of concrete, masonry, or like material so as to become anchored within the hole when the head is struck.

The shank is formed so as to have three distinct portions, namely a proximal portion adjacent to the head, a distal portion spaced from the proximal portion, and a transitional portion joined to the proximal portion at a proximal elbow and to the distal portion at a distal elbow. The proximal and distal portions are substantially straight when the shank is unstressed. The transitional portion may also be substantially straight when the shank is unstressed.

The shank has a spring temper. A preferred material for the shank (and for the anchoring device if it is made as a single piece) is American Iron and Steel Institute (AISI) C 1038 or C1040 steel, which has been heat-treated to a spring temper after it has been formed with the proximal, transitional, and distal portions.

The proximal and distal portions define respective axes. The axis defined by means of the proximal portion and the axis defined by means of the distal portion do not coincide when the shank is unstressed. Preferably, the axis defined by means of the proximal portion and the axis defined by means of the distal portion are substantially parallel, but spaced-apart, when the shank is unstressed.

Preferably, as well, the transitional portion defines an axis that is substantially coplanar with the respective axes defined by means of the proximal and distal portions respectively and intersects each of the axes defined thereby at a substantially similar acute angle when the shank is unstressed. Such an angle may be approximately 20°.

It is a significant feature of this invention that each of the proximal and distal portions has an axial length equal to at least approximately twice its greatest linear dimension measured in cross-section and that the transitional portion has an axial length equal to at least approximately its greatest linear dimension measured in cross-section. Thus, if each of the proximal and distal portions is substantially circular in cross-section, its axial length is equal to at least approximately twice its diameter. Also, if the transitional portion is substantially circular in cross-section, its axial length is equal to at least approximately its diameter.

Because of the significant feature noted above, the distal portion facilitates initial entry of the shank into the hole as the shank is driven into the hole as far as the distal elbow. Moreover, the distal and transitional portions act as lever arms bearing at the distal elbow against the cylindrical wall of the hole, and tending to straighten the shank at the distal elbow, as the shank is driven into the hole as far as the proximal elbow. Furthermore, the transitional and proximal portions act as lever arms bearing at the proximal elbow against the cylindrical wall, and tending to straighten the shank at the proximal elbow, as the shank is driven into the hole beyond the proximal elbow.

It is preferred that the shank has a substantially uniform, substantially circular cross-section along substantially all of the proximal, transitional, and distal portions, except at the proximal and distal elbows. It is also preferred that, at such elbows, the shank has smaller, non-circular cross-sections causing the shank to be preferentially bendable at such elbows.

With reference to an anchoring device constructed according to this invention wherein the axes defined by means of the proximal and distal portions are parallel with respect to each other, but also spaced-apart, when the shank is unstressed, it is believed that the spring temper of the shank causes the proximal and distance portions to become substantially parallel with respect to the cylindrical wall of the hole after the shank has been driven into the hole. It is believed, therefore, that frictional engagement between the shank and the cylindrical wall of the hole is effected substantially along the proximal and distal portions as well as at the proximal and distal elbows.

Furthermore, as a preferred feature, each of the proximal and distal portions is notched along a substantially cylindrical surface portion that confronts the cylindrical wall of the hole when the shank is driven into the hole. It is believed that the notched surfaces enhance frictional engagement between the shank and the cylindrical wall of the hole after the shank has been driven into the hole.

BRIEF DESCRIPTION OF THE DRAWINGS

These and other objects, features, and advantages of this invention will become evident from the following of five alternate embodiments of this invent w reference to the accompanying drawings, in which like reference characters designate like or corresponding parts throughout the several views, and wherein:

FIG. 1 is a perspective view of an anchoring device cons a first embodiment of this invention and having defining threaded stud.

FIGS. 2 and 3 are elevational views of the anchoring of FIG. 1, as taken from different vantage points.

FIGS. 4, 5, 6 are respective views illustrating successive steps in installing the anchoring device of FIG. 1 within a hole having a cylindrical wall within a body of concrete, masonry, or like material, each view being taken at an axial section through the hole.

DETAILED DESCRIPTION OF THE ILLUSTRATED EMBODIMENTS

Figure 7:
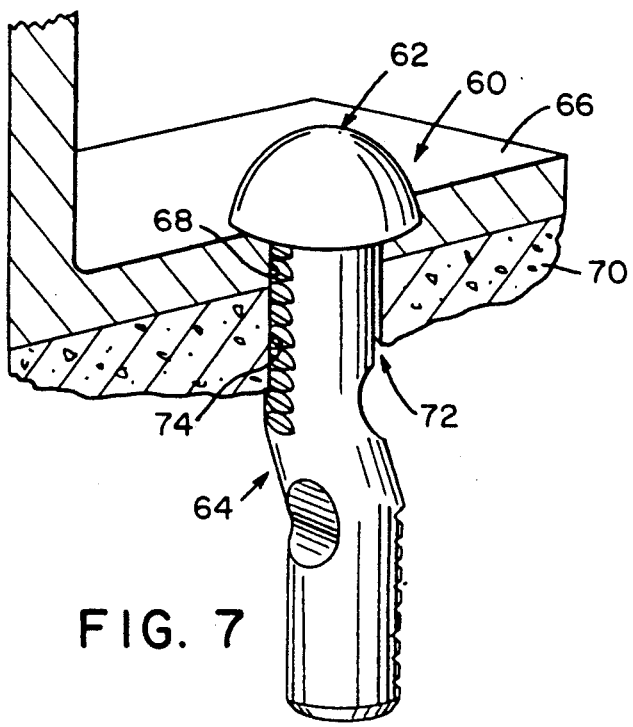
FIG. 7 is a view analogous to FIGS. 4, 5, and 6 and illustrative of an anchoring device constituting second embodiment of this invention and having a head, as used to mount a bracket.

While five alternative embodiments of this invention are illustrated in the drawings and are to be hereinafter described, it is to be understood that these are exemplary embodiments and that this invention is not necessarily limited to these illustrated embodiments.

In each of these illustrated embodiments, an anchoring device is provided, which has a head and a shank. These illustrated embodiments differ from one another only in connection with the specific details of the head.

The anchoring device of each of these illustrated embodiments is made as a single piece, preferably from American Iron and Steel Institute (AISI) C 1038 or C 1040 steel, which has been heat-treated to a spring temper after the shank has been formed in a manner to be hereinafter described. Preferably, the heat-treated steel has a hardness within a range from approximately Rockwell C23 to approximately Rockwell C 34, a minimum yield strength of approximately 92,000 psi, and a minimum tensile strength of approximately 120,000 psi.

As shown in FIGS. 1 through 6, an anchoring device 10 constituting a first embodiment of this invention comprises a head 12 and a shank 14. The head 12 defines a threaded stud with external threads 16 and is adapted to mount an external element (not shown) with internal threads fitting engaging the threads 16.

The anchoring device 10 is formed from a blank (not shown) including a portion having a substantially uniform, substantially circular cross-section and is formed by stamping, forging, or swaging the blank so as to form the head 12 and the shank 14 before the anchoring device 10 is heat-treated. Specifically, the shank 14 is formed so as to have a proximal portion 20 adjacent to the head 12, a distal portion 22 spaced from the proximal portion 20, and a transitional portion 24 between the proximal portion 20 and the distal portion 22. The transitional portion 24 is joined to the proximal portion 20 at a proximal elbow 26 and is joined to the distal portion 22 at a distal elbow 28. The shank 14 has a proximal end 30, which is joined to the head 12, and a distal end 32, which is chamfered.

The shank 14 is formed so that the proximal portion 20, the distal portion 22, and the transitional portion 24 are substantially straight when the shank 14 is unstressed, as shown in FIGS. 1, 2, and 3. Thus, the proximal portion 20, the distal portion 22, and the transitional portion 24 define respective axes, which are substantially coplanar (see, for example, FIG. 2) when the shank 14 is unstressed. The axis defined by means of the proximal portion 20 and the axis defined by means of the distal portion 22 are substantially parallel but laterally spaced-apart (see, for example, FIG. 3) when the shank 14 is unstressed. The axis defined by means of he transitional portion 24 intersects each of these substantially parallel axes at a substantially similar acute angle when the shank 14 is unstressed. The acute angle at each intersection of the axes is approximately 20°.

The proximal portion 20 has an axial length equal to approximately twice its diameter. The distal portion 22 has an axial length equal to approximately twice its diameter. The transitional portion 24 has an axial length approximately equal to its diameter.

The shank 14 is formed with a tool indentation 34 where the proximal elbow 26 is concave and with a tool indentation 36 where the distal elbow 28 is concave. The tool indentations 34, 36, are lenticular. The shank 14 has a substantially uniform, substantially circular cross-section, except at the proximal elbow 26 where the tool indentation 34 provides the shank 14 with a smaller, non-circular cross-section, and except at the distal elbow 28 where the tool indentation 36 provides the shank 14 with a smaller, non-circular cross-section. The smaller, non-circular cross-sections of the shank 14 at the tool indentations 34, 36, facilitate forming the shank 14 by causing the shank 14 to be preferentially bendable at the elbows 26, 28, as the shank 14 is formed.

The shank 14 is formed with a series of sharp-crested, lenticular notches 38, which are arrayed axially along a substantially cylindrical surface 40 of the proximal portion 20, between the proximal end 30 and the proximal elbow 26. Some of the notches 38 at one end of the series are diametrically opposed to the tool indentation 34. The shank 14 is formed with a series of similar notches 42, which are arrayed axially along a substantially cylindrical surface 44 of the distal portion 22, between the distal end 32 and the distal elbow 28. Some of the notches 42 at one end of the series are diametrically opposed to the tool indentation 36.

As shown in FIGS. 4, 5, and 6, the shank 14 can be easily driven into a hole 50 with having a cylindrical wall 52 and defined within a body 54 of concrete, masonry, or like material so as to become anchored within the hole 50. Such material is characterized by high compressive strength and, therefore, exhibits very little yield, when compressed. When the head 12 is struck by means of a hammer (not shown) or by means of a driving ram (not shown) of a powered tool, the shank 14 is forcibly driven into the hole 50, within which the shank 14 becomes anchored.

Optimally, each of the proximal, transitional, and distal portions of the shank 14 has a diameter of approximately 0.250-0.252 inch except at the proximal and distal elbows, the shank 14 when unstressed has an overall length of approximately 1.300-1.350 inches between the proximal end 30 and the distal end 32, along a line parallel to the axes defined by means of the proximal and distal portions, and each of the proximal and distal portions has an axial length of approximately 0.500 inch. Thus, the shank 14 may be optimally anchored within a hole having a diameter ranging from approximately 0.260 inch to approximately 0.268 inch within a body of concrete, masonry, or like material.

As shown in FIG. 4, the distal portion 22, which is substantially straight when the shank 14 is unstressed, facilitates initial entry of the shank 14 into the hole 50 as the shank 14 is driven into the hole 50 as far as the distal elbow 28. Typically, the hole 50 is larger in cross-section, as compared to the shank 14, which may thus be loosely inserted into the hole 50 as far as the distal elbow 28.

As is shown in FIG. 5, the distal portion 22 and the transitional portion 24 act as lever arms bearing at the distal elbow 28 against the cylindrical wall 52 of the hole 50, and tending to straighten the shank 14 at the distal elbow 28, as the shank 14 is driven into the hole 50 as far as the proximal elbow 26. The smaller, non-circular cross-section of the shank 14 at the tool indentation 36 causes the shank 14 to be preferentially bendable at the distal elbow 28.

As shown in FIG. 6, the transitional portion 24 and the distal portion 22 act as lever arms bearing at the proximal elbow 26 against the cylindrical wall 52 of the hole 50, and tending to straighten the shank 14 at the proximal elbow 26, as the shank 14 is driven into the hole 50 beyond the proximal elbow 26. The smaller, non-circular-cross-section of the shank 14 at the tool indentation 34 causes the shank 14 to be preferentially bendable at the proximal elbow 26. Preferably, the shank 14 is driven into the hole 50 as far as the proximal end 30, but not farther, so that the head 12 remains exposed.

It is believed that the spring temper of the shank 14 causes the proximal portion 20 and the distal portion 22 to become substantially parallel with the cylindrical wall 52 of the hole 50, as shown in FIG. 6, after the shank 14 has been driven into the hole 50. It is believed, therefore, that frictional engagement between the shank 14 and the cylindrical wall 52 of the hole 50 is effected substantially along the proximal portion 20 and along the distal portion 22 as well as at the proximal elbow 26 and at the distal elbow 28. It is believed, moreover, that the notches 38 disposed along the substantially cylindrical surface 40 of the proximal portion 20 and the notches 42 along the substantially cylindrical surface 44 of the distal portion 22 enhance the frictional engagement defined between the shank 14 and the cylindrical wall 52 of the hole 50.

As shown in FIG. 7, an anchoring device 60 constituting a second embodiment of this invention comprises a button head 62 and a shank 64. The button head 62 is shown as used to mount a bracket 66, which has a hole 68 so as to receive the shank 64, to a body 70 of concrete, masonry, or like material when the shank 14 is anchored within a hole 72 having a cylindrical wall 74 defined within the body 70. The bracket 66 is exemplary of external elements that can be similarly mounted.

The shank 64 of the anchoring device 60 is similar to the shank 14 of the anchoring device 10. The shank 64 may be similarly drive into the hole 72 so as to become similarly anchored within the hole 72.

Figure 8:
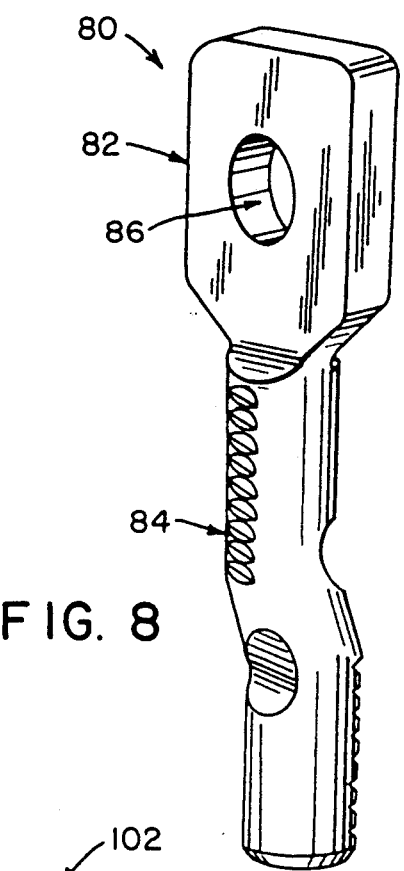
FIG. 8 is a fragmentary, perspective view of an anchoring device constituting a third embodiment of this invention and a head defining an eyelet.

As shown in FIG. 8, an anchoring device 80 constituting a third embodiment of this invention comprises a head 82 and a shank 84. The head 82 is tabular, as shown, and defines an eyelet 86 adapted to mount a wire (not shown) tied to the head 82.

The shank 84 of the anchoring device 80 is similar to the shank 14 of the anchoring device 10. The shank 84 may be similarly driven into a hole (not shown) having a cylindrical wall defined within a body of concrete, masonry or like material so as to become similarly anchored within the hole.

Figure 9:
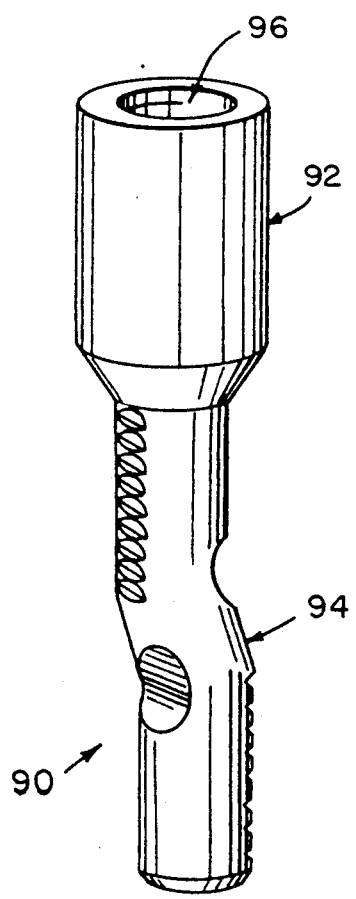
FIG. 9 is a fragmentary, perspective view of an anchoring device constituting a fourth embodiment of this invention and having a head defining a threaded socket.

As shown in FIG. 9, an anchoring device 90 constituting a fourth embodiment of this invention comprises a head 92 and a shank 94. The head 92 is tubular, as shown, and defines a threaded socket 96 adapted to mount an external element (not shown) having a threaded portion to be engaged within the threaded socket 96.

The shank 94 of the anchoring device 90 is similar to the shank 14 of the anchoring device 10. The shank 94 may be similarly driven into a hole (not shown) having a cylindrical wall defined within a body of concrete, masonry, or like material so as to become similarly anchored within the hole.

Figure 10:
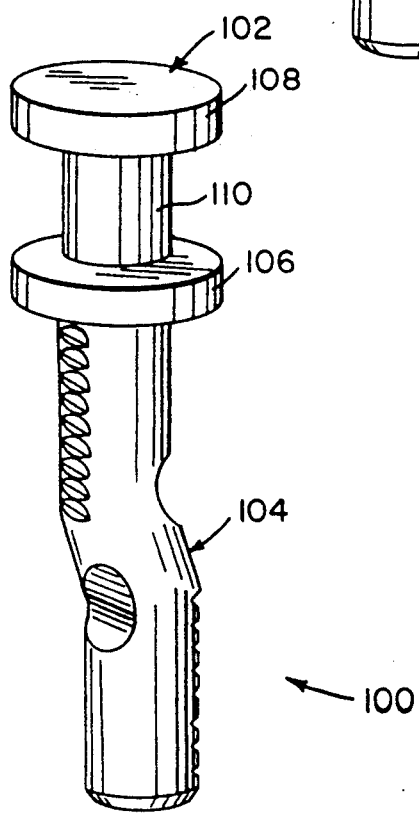
FIG. 10 is a fragmentary, perspective view of an anchoring constituting a fifth embodiment of this invention and having a duplex head.

As shown in FIG. 10, an anchoring device 100 constituting a fifth embodiment of this invention comprises a duplex head 102 and a shank 104. The duplex head 102 has an inner portion 106, an outer portion 108, and a shank portion 100 defined between the inner portion 106 and the outer portion 108.

The shank 104 of the anchoring device 100 is similar to the shank 14 of the anchoring device 10. The shank 104 may be similarly driven into a hole (not shown having a cylindrical wall defined within a body of concrete, masonry, or like material so as to become similarly anchored within the hole.

The anchoring device 100 has uses similar to uses of the anchoring device 60 but is removable from the concrete, masonry, or similar material with greater ease because of the duplex head 102. The inner portion 106 of the duplex head 102 functions as the button head 62 of the anchoring device 60 functions. A crowbar (not shown) or like tool can be easily inserted between the inner portion 106 and the outer portion 108, and against the shank portion 110, when it is desired to pry the anchoring device 100 from the hole.

Various modifications may be made in any of the illustrated embodiments without departing from the scope and spirit of this invention which is defined by means of the appended claims.

I claim:
1. An anchoring device, comprising:
   a head for mounting an external element;
   a shank integral with said head and adapted to be forcibly driven into a hole defined within a founda- tion member to which said external element is to be secured by means of said anchoring device;

said shank comprising a first substantially linear proximal portion adjacent to said head, a second substantially linear distal portion axially spaced from said proximal portion, and a transitional portion interposed between said interconnecting said proximal and distal portions by means of a proximal elbow portion and a distal elbow portion such that respective axes of said proximal and distal portions of said shank are laterally offset and dispossubstantially parallel with respect to each other; and indentation means defined within both of said proximal and distal elbow portions of said shank for facilitating bending of said shank at said proximal and distal elbow portions of said shank as said shank is driven into said hole defined within said foundation member.

2. An anchoring device as set forth in claim 1, wherein:
said shank comprises heat-treated, spring-tempered steel.

3. An anchoring device as set forth in claim 2, wherein:
said heat-treated steel has a hardness within the range of approximately Rockwell C23-Rockwell C34.

4. An anchoring device as set forth in claim 3, wherein:
said heat-treated steel has a minimum yield strength of approximately 92,000 psi.

5. An anchoring device as set forth in claim 3, wherein:
said heat-treated steel has a minimum tensile strength of approximately 120,000 psi.

6. An anchoring device as set forth in claim 1, wherein:
said head comprises a threaded stud.

7. An anchoring device as set forth in claim 1, wherein:
said head comprises a button-type head for securing a bracket-type external element.

8. An anchoring device as set forth in claim 1, wherein:
said head comprises a tabular head having an eyelet defined therein through which a securing wire may be passed.

9. An anchoring device as set forth in claim 1, wherein:
said head comprises a threaded socket.

10. An anchoring device as set forth in claim 1, wherein:
said head comprises a duplex head comprising first and second head portions axially spaced with respect to each other, with an additional shank portion interposed between said first and second head portions 11. An anchoring device as set forth in claim 8, wherein: the proximal portion has an axial length equal to at least approximately twice the greatest linear dimension of the proximal portion measured in cross-section, the distal portion has an axial length equal to at least approximately twice the greatest linear dimension of the distal portion measured in cross-section, and the transitional portion has an axial length equal to at least approximately the greatest linear dimension of the transitional portion measured in cross-section, so that the distal portion constitutes means to facilitate initial entry of the shank into the hole as the shank is driven into the hole as far as the distal elbow, so that the distal and transitional portions constitute means to act a lever arms bearing at the distal elbow against a first cylindrical wall portion of the hole, and tending to straighten the shank at the distal elbow, as the shank is driven into the hole as far as the proximal elbow, and so that the transitional and proximal portions constitute means to act as lever, arms bearing at the proximal elbow against the a second cylindrical wall portion of said hole, and tending to straighten the shank at the proximal elbow, as the shank is driven into the hole beyond the proximal elbow.

12. The anchoring device of claim 1 wherein the axis defined by the proximal portion and the axis defined by the distal portion are substantially parallel, but spaced-apart, when the shank is unstressed.

13. The anchoring device of claim 12 wherein the transitional portion is substantially straight when the shank is unstressed and defines an axis that is substantially coplanar with the axes defined by the proximal and distal portions respectively when the shank is unstressed and that intersects each of the last-mentioned axes at a substantially similar acute angle when the shank is unstressed.

14. The anchoring device of claim 13 wherein the acute angle is approximately 20°.

15. The anchoring device of claim 1 wherein the shank has a substantially uniform, substantially circular cross-section along substantially all of the proximal, transitional, and distal portions, except at the proximal and distal elbows, at which the shank has smaller, non-circular cross-sections causing the shank to be preferentially bendable at the proximal and distal elbows.

16. The anchoring device of claim 15 wherein each of the proximal and distal portions is notched along a substantially cylindrical surface, which confronts cylindrical wall portions of the hole when the shank is driven into the hole, such that frictional engagement is enhanced between the shank and the cylindrical wall of the hole.

* * * * *

UNITED STATES PATENT AND TRADEMARK OFFICE
CERTIFICATE OF CORRECTION

PATENT NO. : 5,035,559
DATED      : JULY 30, 1991
INVENTOR(S): MARTIN J. NILSEN

It is certified that error appears in the above-identified patent and that said Letters Patent is hereby corrected as shown below:

```
Column 7, line 11, "dispossubstan-" should be --disposed
          substan- --;

Column 8, line 16, "a" should be --as--;
          line 22, "lever, arms" should be --lever arms--;
          line 23, "the" should be deleted.
```

Signed and Sealed this

Sixteenth Day of November, 1993

Attest:

BRUCE LEHMAN

*Attesting Officer*     Commissioner of Patents and Trademarks